United States Patent
Dryden, Jr.

[15] 3,678,082
[45] July 18, 1972

[54] ESTERIFICATION OF 17-HYDROXY STEROIDS

[72] Inventor: Hugh L. Dryden, Jr., Deerfield, Ill.
[73] Assignee: G. D. Searle & Co., Chicago, Ill.
[22] Filed: July 30, 1970
[21] Appl. No.: 64,904

[52] U.S. Cl..................................260/397.5, 260/397.45
[51] Int. Cl.......................................................C07c 167/28
[58] Field of Search....................Machine Searched Steroids

*Primary Examiner*—Henry A. French
*Attorney*—John M. Brown, John J. Kolano, Elliot N. Schubert, Lowell C. Bergstedt, Sybil Meloy, Walter C. Ramm and Helmuth A. Wegner

[57] ABSTRACT

17-Hydroxy steroids can be esterified in nearly quantitative yields using the appropriate anhydride with 4-dimethylaminopyridine.

5 Claims, No Drawings

ESTERIFICATION OF 17-HYDROXY STEROIDS

Current processes which are used for the esterification of 17-hydroxy groups in steroids, and particularly in 17α-alkynyl steroids, have a number of disadvantages. Thus, these reactions are generally carried out at considerably above room temperature so that side reactions, rearrangements, or decomposition can take place readily. For example, if the steroid contains a 3-keto-Δ⁴ system, it is possible for an enol ester to form or, if the steroid contains a 3-hydroxy-Δ⁴ system, the 3,5-diene can form. All these reactions serve to reduce the yield of the desired steroid. Since the steroid materials involved are quite expensive, a process which would provide even a slight increase in the yield would be valuable.

Thus, the present invention relates to a new process for the preparation of steroid esters. More particularly, this invention relates to a new process for carrying out the following reaction:

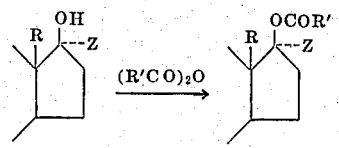

wherein R and R' are lower alkyl containing up to six carbon atoms and Z is lower alkynyl containing up to six carbon atoms. Examples of lower alkyl groups are methyl and ethyl which are particularly preferred. In the case of R', the compounds involved are anhydrides so that the preferred materials are acetic anhydride and propionic anhydride. Z in the above reaction can be illustrated by ethynyl, propynyl, and butynyl.

The present process is usually carried out at room temperature in the presence of a tertiary amine and 4-dimethylaminopyridine to give practically quantitative yields of the desired product. Use of higher temperatures reduces the amount of 4-dimethylaminopyridine needed to promote the reaction. The tertiary amine serves to neutralize the acid formed during the course of the reaction without taking part in the reaction itself. Thus, a simple and relatively inexpensive amine such as triethylamine or tri-n-butylamine can serve this purpose. Actually, although the 4-dimethylaminopyridine is used in the reaction primarily as a catalyst, it can also serve the same purpose as the tertiary amine. In that situation it would be used in equimolar quantities with the reactants. However, since it serves primarily as a catalyst and in view of the fact that it is an expensive material, it is preferably used only in catalytic amounts and a less expensive amine is used to neutralize the acid.

The general formulas used above to illustrate the present process show only the D-ring of the steroid system because the actual structure of the remainder of the molecule does not affect the reaction at the D-ring. However, if reactive hydroxy groups are present elsewhere in the molecule, they will also be esterified in the course of the present process. More specifically, if a 3β-hydroxy group is present, it will be esterified to give the diester. A conversion of this type can be illustrated by the following reaction equation:

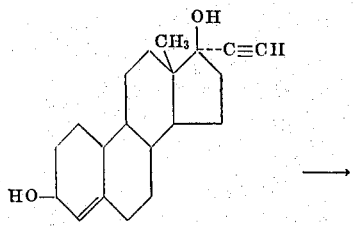

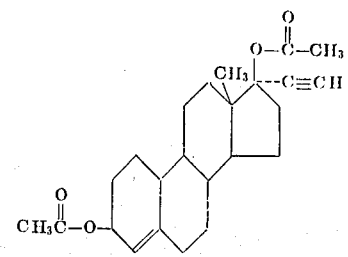

The compound resulting from this reaction is useful because of its pharmacological properties. In particular, 17α-ethynyl-4-estrene-3β,17β-diol diacetate is a progestational agent and is a constituent of the product marketed in the United States as Ovulen.

Examples of other 17-hydroxy compounds which can be esterified by the present process are 17α-ethynyl-18-methyl-4-estrene-3β,17β-diol, 17α-ethynyl-17β-hydroxy-11-methyl-4-estren-3-one, and 3β-acetoxy-17α-ethynyl-4-estren-17β-ol.

The following examples are presented to illustrate the present invention. They should not be construed as limiting it in any way. In these examples, quantities are indicated in parts by weight and temperatures in degrees centigrade (° C.).

EXAMPLE 1

A mixture of 3.0 parts of 17α-ethynyl-4-estrene-3ββ-diol, 4.3 parts of acetic anhydride, and 2.9 parts of triethylamine is stirred under nitrogen in a water bath at 25° C. Then, 0.1 part of 4-dimethylaminopyridine is added. Almost immediately, the temperature rises. The course of the reaction can be followed by withdrawal of small aliquots which are added to methanol and subjected to thin layer chromatography using 10 percent ethyl acetate in benzene on silica plates. Stirring is discontinued after 24 hours when chromatography shows no unacetylated material. The mixture is then poured into 80 parts of methanol and the resulting mixture is evaporated to an aqueous slurry on a rotary evaporator. It is then allowed to digest for 2 hours before the solid is separated by filtration, washed and dried. The reaction gives 3.2 parts of 17α-ethynyl-4-estrene-3β,17β-diol diacetate melting at about 128°–131° C., [α] = −69.4.

EXAMPLE 2

If the procedure of Example 1 is repeated using 17α-ethynyl-18-methyl-4-estrene-3β,17β-diol and 17α-ethynyl-17β-hydroxy-11β-methyl-4-estren-3-one, the products obtained in nearly quantitative yields are, respectively, 17α-ethynyl-18-methyl-4-estrene-3β,17β-diol diacetate and 17α-ethynyl-17β-hydroxy-11β-methyl-4-estren-3-one acetate.

What is claimed is:

1. A process for the preparation of lower alkanoyl esters of 17α-ethynyl-17β-hydroxy steroids which comprises reacting a 17α-ethynyl-17β-hydroxy steroid with a lower alkanoic acid anhydride in the presence of 4-dimethylamino pyridine.

2. A process according to claim 1 for the preparation of lower alkanoyl esters of 17α-ethynyl-17β-hydroxy steroids which comprises reacting a 17α-ethynyl-17β-hydroxy steroid with a lower alkanoic acid anhydride in the presence of 4-dimethylaminopyridine and a tertiary amine.

3. A process according to claim 1 for the preparation of 17α-ethynyl-4-estrene-3β,17β-diol diesters which comprises reacting 17α-ethynyl-4-estrene-3β,17β-diol with a lower alkanoic acid anhydride in the presence of 4-dimethylaminopyridine.

4. A process according to claim 1 for the preparation of 17α-ethynyl-4-estrene-3β,17β-diol diacetate which comprises reacting 17α-ethynyl-4-estrene-3β,17β-diol with acetic anhydride in the presence of 4-dimethylaminopyridine.

5. A process according to claim 1 for the preparation of 17α-ethynyl-4-estrene-3β,17β-diol diacetate which comprises reacting 17α-ethynyl-4-estrene-3β,17β-diol with acetic anhydride in the presence of 4-dimethylaminopyridine and triethylamine.

* * * * *